United States Patent [19]

McAfee

[11] Patent Number: 4,558,109

[45] Date of Patent: Dec. 10, 1985

[54] CURABLE ORGANOPOLYSILOXANE COMPOSITIONS

[75] Inventor: Richard C. McAfee, Tecumseh, Mich.

[73] Assignee: SWS Silicones Corporation, Adrian, Mich.

[21] Appl. No.: 634,244

[22] Filed: Jul. 25, 1984

[51] Int. Cl.$^4$ ............................................... C08L 83/06
[52] U.S. Cl. ...................... 528/15; 524/862; 525/478; 528/31; 528/32; 528/34
[58] Field of Search ............... 525/478; 528/15, 32, 528/31

[56] References Cited

U.S. PATENT DOCUMENTS

| | | | |
|---|---|---|---|
| 3,419,593 | 12/1968 | Willing | 260/448.2 |
| 3,445,420 | 5/1969 | Kookootsedes et al. | 260/37 |
| 3,453,234 | 7/1969 | Kookootsedes | 260/46.5 |
| 3,518,325 | 6/1970 | Campbell et al. | 525/478 |
| 3,532,649 | 10/1970 | Smith et al. | 260/18 |
| 3,723,567 | 3/1973 | Mink et al. | 260/825 |
| 3,882,083 | 5/1975 | Berger et al. | 260/46 |
| 4,077,937 | 3/1978 | Sato et al. | 260/37 |
| 4,427,574 | 1/1984 | Pierpoint | 528/15 |

FOREIGN PATENT DOCUMENTS

| | | | |
|---|---|---|---|
| 2237551 | 4/1973 | Fed. Rep. of Germany | 525/478 |
| 1152251 | 5/1969 | United Kingdom | 525/478 |

*Primary Examiner*—Wilbert J. Briggs, Sr.

[57] ABSTRACT

An organopolysiloxane composition which has improved adhesion and is curable at an elevated temperature in the presence of atmospheric moisture comprising:

(a) An organopolysiloxane having an average of at least two hydroxyl groups per molecule;

(b) an organosilicon compound containing at least two hydrolyzable groups per molecule which is capable of reacting with the hydroxyl groups of the organopolysiloxane;

(c) an organohydrogenpolysiloxane containing at least one silicon-bonded hydrogen atom per molecule;

(d) a platinum catalyst; and (e) if desired, a condensation catalyst.

The resultant composition is generally heated to an elevated temperature to form an elastomer.

28 Claims, No Drawings

CURABLE ORGANOPOLYSILOXANE COMPOSITIONS

The present invention relates to curable organopolysiloxane compositions and more particularly to organopolysiloxane compositions which have improved adhesion and are curable when heated to elevated temperatures.

BACKGROUND OF THE INVENTION

Organopolysiloxane compositions which are cured by the addition of Si-bonded hydrogen to Si-bonded aliphatic multiple bonds are well known in the art. For example, U.S. Pat. No. 3,419,593 to Willing discloses that an ≡SiH group can be reacted with any silicon compound which contains aliphatic multiple bonds in the presence of a platinum compound such as chloroplatinic acid. While the cure rate of these organopolysiloxane compositions is substantially accelerated with the platinum catalysts, the "pot-life" or working time is substantially decreased. Therefore, it would be desirable to have an organopolysiloxane composition which utilizes a platinum catalyst and cures to an elastomer at an elevated temperature, but has a longer "pot-life" or working time.

Several methods have been proposed to improve the stability of platinum catalyzed organopolysiloxane compositions by adding certain reagents to retard crosslinking at room temperature. Several of the retarding agents used for this purpose are tin compounds such as described in U.S. Pat. No. 3,532,649; isocyanurate compounds such as described in U.S. Pat. No. 3,882,083; sulfoxide compounds such as described in U.S. Pat. No. 3,453,234 and aminosilanes, such as described in U.S. Pat. No. 3,723,567. Other retarding agents which have been used are acetylenic compounds such as those described in U.S. Pat. No. 3,445,420 or compounds having at least one monovalent group of the formula

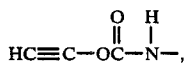

such as described in U.S. Pat. No. 4,077,937.

Many of the retarding agents described above have the disadvantage that they must be used in large amounts, which eventually result in a decrease in the cure rate and thus provide for insufficient cures even at elevated temperatures. The use of acetylenic compounds has the disadvantage that the use of a compound having a relatively low boiling point tends to decrease the stability of the composition even at room temperature due to loss on evaporation. Likewise, a compound having a relatively high boiling point often results in an unsatisfactory cure even when subjected to heat.

It is, therefore, an object of the present invention to provide organopolysiloxane compositions which are substantially free from crosslinking at room temperature under anhydrous conditions. Another object of the present invention is to provide organopolysiloxane compositions which utilize ≡SiH containing compounds. Still another object of the present invention is to provide organopolysiloxane compositions which are heat activated. Still another object of the present invention is to provide platinum catalyzed organopolysiloxane compositions which are substantially free of crosslinking at room temperature under anhydrous conditions in the absence of additional retarding agents. A further object of the present invention is to provide organopolysiloxane compositions which utilize a mixed crosslinking system. A still further object of the present invention is to provide organopolysiloxane compositions having improved adhesion to substrates which generally poison platinum catalyzed systems.

SUMMARY OF THE INVENTION

The foregoing objects and others which will become apparent from the following description are accomplished in accordance with this invention, generally speaking, by providing a curable composition comprising:
(a) An organopolysiloxane having an average of at least two hydroxyl groups per molecule;
(b) an organosilicon compound containing at least two hydrolyzable groups per molecule which is capable of reacting with the hydroxyl groups linked to the organopolysiloxane;
(c) an organohydrogenpolysiloxane containing at least one silicon-bonded hydrogen atom per molecule;
(d) a platinum catalyst; and,
(e) if desired, a condensation catalyst.

The resultant composition is heated to an elevated temperature to form an elastomer.

DESCRIPTION OF THE INVENTION

Organopolysiloxane fluids containing hydroxyl groups which have been used heretofore in curable compositions may be used in the compositions of this invention. The organopolysiloxanes having terminal Si-bonded hydroxyl groups may be represented by the formula

where R, which may be the same or different, represents monovalent hydrocarbon radicals and substituted monovalent hydrocarbon radicals and m is a number whose value is such that the organopolysiloxanes have an average viscosity of from 50 to 500,000 mPa.s and more preferably from about 100 to 150,000 mPa.s at 25° C. Generally, these organopolysiloxanes contain from 1.8 to about 2.2 organic groups per silicon atom.

These organopolysiloxane fluids are generally linear or branched organopolysiloxanes which may also contain other siloxane units in addition to the diorganosiloxane units of the formula $SiR_2O$. Examples of other siloxane units which may be present are those corresponding to the following formulas: $RSiO_{3/2}$, $R_3SiO_{\frac{1}{2}}$ and $SiO_{4/2}$; where R is the same as above. Other organopolysiloxanes which may be used are organopolysiloxane resins containing from about 0.9 up to about 1.8 organic radicals per silicon atom.

It is preferred that the organic radicals in the organopolysiloxanes have from 1 to 18 carbon atoms per organic radical. Examples of suitable organic radicals represented by R in the formulas above are alkyl radicals, such as the methyl, ethyl, n-propyl and isopropyl radicals as well as octadecyl radicals; alkenyl radicals such as the vinyl and allyl radicals; cycloalkyl radicals such as the cyclohexyl, cyclohexenyl and cycloheptyl radicals; aryl radicals such as the phenyl radical; alkaryl radicals such as the tolyl radical; and aralkyl radicals such as the benzyl radical. Examples of substituted hydrocarbon radicals are halogenated hydrocarbon radicals such as the 3,3,3-trifluoropropyl radical and o-, p- and m-chlorophenyl radicals; and cyanoalkyl radicals, such as the beta-cyanoethyl radical. Because of their availability, it is preferred that at least 50 percent and more preferably at least 80 percent of the number of R radicals in the organopolysiloxanes be methyl radicals.

Also, mixtures of various organopolysiloxanes, especially mixtures consisting of at least one organopolysiloxane having a viscosity of less than 50,000 mPa.s at 25° C. and at least one organopolysiloxane having a viscosity of more than 500,000 mPa.s at 25° C. may be used. It is preferred that the average viscosity of the mixture be a maximum of about 50,000 mPa.s at 25° C.

The hydroxyl-terminated organopolysiloxane fluids employed in the compositions of this invention may vary from a low viscosity fluid up to viscous gums depending on the value of m above and the nature of the particular R group attached to the silicon atom. Preferably, the hydroxyl-terminated organopolysiloxanes have a viscosity of from about 50 to about 500,000 mPa.s and more preferably from about 100 to 150,000 mPa.s at 25° C.

The hydroxyl-terminated organopolysiloxanes may be homopolymers as well as copolymers containing more than one type of diorganosiloxane unit. For example, the organopolysiloxanes may be copolymers of dimethylsiloxane units and methylphenylsiloxane units, as well as copolymers of dimethylsiloxane units, diphenylsiloxane units and methylvinylsiloxane units.

The same organosilicon compounds which could have been used heretofore in the preparation of compositions which crosslink to form elastomers when exposed to moisture at room temperature may be used in the compositions of this invention. The organosilicon compound, which contains at least two hydrolyzable groups, is a silane of the formula $$R_a'SiZ_{4-a}$$

where R' is a monovalent hydrocarbon radical, a substituted monovalent hydrocarbon radical, a hydrocarbonoxy radical or mixtures thereof, Z is a hydrolyzable group or mixtures of hydrolyzable groups and a is 0, 1 or 2, and partial hydrolyzates thereof having from 2 to 10 silicon atoms per molecule.

Examples of hydrolyzable groups represented by Z are acyloxy groups (—OOCR), aminoxy groups (—ONR$_2$"), amine groups (such as —NR$_2$"), acylamine groups (such as —NRCOR), and oxime groups (such as —ON=CR$_2$), in which the R and R" radicals may be the same or different. In the above formulas, R represents the same or different monovalent hydrocarbon radicals or substituted monovalent hydrocarbon radicals and R" is the same as R or hydrogen.

Examples of radicals represented by R above in the organosilicon compounds are the same as those represented by R in the organopolysiloxanes and examples of radicals represented by R' are the same as those represented by R in the organopolysiloxanes.

It is preferred that at least one R' group of the organosilicon compound contain from 2 to 10 carbon atoms. Moreover, it is preferred that the R' group contain aliphatic unsaturation. Specific examples of such radicals are vinyl, allyl, 2-butenyl, 1,3,-butadienyl, 2-pentenyl, 1-hexenyl, 2-hexenyl, 1-octenyl, 2-octenyl and 3-octenyl radicals.

Examples of suitable hydrocarbonoxy radicals represented by R' are alkoxy radicals having from 1 to 10 carbon atoms, such as methoxy, ethoxy, n-propoxy, isopropoxy, butoxy, hexyloxy, heptyloxy and octyloxy radicals; alkenyloxy radicals, such as vinyloxy, allyloxy ethylallyloxy, isopropenyloxy and butadienyloxy radicals as well as aryloxy radicals such as phenoxy radicals.

Specific examples of acyloxy groups having from 1 to 18 carbon atoms are formyloxy, acetoxy, propionyloxy, valeroyloxy, octyloxy, myristyloxy and stearoyloxy groups, with acetoxy being the preferred example.

Examples of aminoxy groups are dimethylaminoxy, diethylaminoxy, dipropylaminoxy, dibutylaminoxy, dioctylaminoxy, diphenylaminoxy, ethylmethylaminoxy, and methylphenylaminoxy groups.

Specific examples of amine groups are n-butylamino, sec-butylamino and cyclohexylamino groups.

An example of an acylamino group is the benzoylmethylamino group.

Specific examples of oxime groups are acetaldoxime, acetophenonoxime, acetonoxime, benzophenonoxime, 2-butanonoxime, diisopropylketoxime, and chlorocyclohexanononoxime groups.

The organosilicon compounds employed as crosslinking agents are generally employed in the compositions of this invention in such proportions that there is a total of at least one mol of the organosilicon compound per gram equivalent of hydroxyl group in the organopolysiloxane. Generally, from about 0.2 to 15 percent by weight of organosilicon compound and more preferably from about 1 to 10 percent by weight of organosilicon compound based on the weight of the hydroxyl containing organopolysiloxane is present in the composition.

The organohydrogenpolysiloxanes employed in the compositions of this invention may be the same organohydrogenpolysiloxanes which have been or could have been used heretofore in compositions containing organopolysiloxanes having silicon-bonded multiple bonds and organohydrogenpolysiloxanes containing silicon-bonded hydrogen atoms that are crosslinked in the presence of a platinum catalyst. The organohydrogenpolysiloxanes preferably have units of the formula $$R_bH_cSiO_{\frac{4-b-c}{2}},$$

where R is a monovalent hydrocarbon radical or substituted monovalent hydrocarbon radical, b has a value of from 0 to 2.5, preferably from 0.5 to 2.1 and c has a value of from 0.0005 to 2.0 and the sum of b and c is equal to from 1.0 to 3.

Examples of suitable monovalent hydrocarbon radicals represented by R are alkyl radicals having from 1 to 18 carbon atoms, such as the methyl, ethyl, propyl, butyl, hexyl, octyl, decyl and octadecyl radicals; alkenyl radicals such as the vinyl and allyl radicals; cycloalkyl radicals such as the cyclopentyl and cyclohexyl radicals; aryl radicals such as the phenyl and naphthyl radicals; alkaryl radicals such as the benzyl radical, the alpha, beta-ethylphenyl radicals and the alpha, beta-propylphenyl radicals; and halogenated derivatives of the aforesaid radicals including chloromethyl, trifluoromethyl, chloropropyl, chlorophenyl, dibromophenyl, tetrachlorophenyl and difluorophenyl radicals. It is preferred that the R groups have from 1 to 3 carbon atoms and more preferably that R be a methyl radical. For purposes of this invention, the SiH containing organopolysiloxanes represented by the above formula may have a viscosity in the range of from 10 to 500,000 mPa.s at 25° C., and more preferably from 10 to 10,000 mPa.s at 25° C.

The above formula is intended to include organohydrogenpolysiloxanes which have terminal SiH groups or contain SiH groups along the chain or which are SiH-terminated and also contain SiH groups along the chain. It is preferred that the organohydrogenpolysiloxanes contain at least two silicon bonded hydrogen groups per molecule, especially if the resultant composition is to be converted to an elastomer.

The organohydrogenpolysiloxanes may also be copolymers which contain at least one unit per molecule of the formula

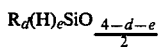

where R is the same as above, d has a value of 0, 1 or 2, e has a value of 1 or 2 and the sum of d and e is equal to 1, 2 or 3 and the remaining siloxane units being units of the formula

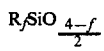

where R is the same as above and f has a value of 0, 1, 2 or 3. Thus, the organohydrogenpolysiloxane may be a copolymer having from 0.1 to 99.5 mole percent of siloxane units of the formula

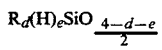

and from 0.5 to 99.9 mol percent of siloxane units of the formula

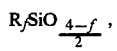, where R, d, e and f are the same as above.

Examples of siloxane units having the formula

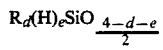

are hydrogensiloxane units (HSiO$_{1.5}$), methylhydrogensiloxane units (HSiCH$_3$O), dimethylhydrogensiloxane units [H(CH$_3$)$_2$SiO$_{0.5}$] and dihydrogensiloxane units (H$_2$SiO).

The ≡SiH-terminated organohydrogenpolysiloxanes may be represented by the formula

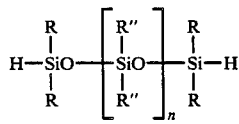

where R is the same as above, R", which may be the same or different is R or hydrogen, and n has a value sufficient to provide a viscosity of from 10 to 500,000 mPa.s at 25° C. Preferably some of the R" radicals are hydrogen and the remaining R and R" are monovalent hydrocarbon radicals. It is preferred that the R groups be methyl radicals. Suitable organohydrogenpolysiloxanes are described in U.S. Pat. Nos. 2,823,218; 3,159,662; and 3,220,972.

The reaction between the hydroxyl containing organopolysiloxanes and the organosilicon compounds containing at least two hydrolyzable groups in the presence of moisture is dependent on the type of hydrolyzable group and the number of hydrolyzable groups linked to the silicon atom. The reaction can be accelerated by using elevated temperatures or by using catalysts which promote the condensation reaction between the hydroxyl groups present on the organopolysiloxane and the hydrolyzable groups of the organosilicon compound.

Any suitable condensation catalyst may be employed which does not substantially inhibit the subsequent platinum catalyzed reaction. Suitable examples of condensation catalysts which may be employed are organic amines such as methylamine, ethylamine, butylamine, aniline, and pyridine; alkanolamines, such as triethanolamine; organic titanates; organosiloxy titanium compounds; metal salts of carboxylic acids such as dibutyltin dilaurate, ferric octoate; phosphoric acid salts of a basic amino compound and carboxylic acid salts of quaternary ammonium hydroxide.

The amount of condensation catalyst employed in the compositions of this invention may vary over a wide range. Generally, the greater the amount of condensation catalyst employed, the more rapid the reaction between the hydroxyl groups present in the organopolysiloxane and the hydrolyzable groups present on the organosilicon compounds. However, some of the condensation catalysts may inhibit the reactivity of the platinum catalyst employed in the compositions of this invention; therefore, it is preferred that the amount of condensation catalyst range from zero to about 8 percent by weight and more preferably from about 0 to 5 percent by weight based on the weight of the organopolysiloxane.

Other catalysts which may be employed in the compositions of this invention to promote curing may be any of the platinum compounds or platinum complexes which have been employed or could have been employed heretofore to promote crosslinking of compositions containing organopolysiloxanes having ≡SiH groups.

Examples of suitable platinum compounds are chloroplatinic acid, platinum deposited on carriers such as silica gel or powdered charcoal, salts of platinum, reaction products of chloroplatinic acid and alcohols, aldehydes and ketones, platinum-siloxane complexes, platinum-olefin complexes, platinum carboxylates, nitrile-platinum halide complexes, ammonium platinum complexes such as disclosed in U.S. Pat. No. 3,795,656 to Martin, platinum complexes of unsaturated siloxanes which are substantially free of halogen, such as disclosed in U.S. Pat. No. 3,814,730 to Karstedt and platinum-styrene complexes such as described in U.S. Pat. No. 4,394,317 to McAfee et al. Preferably, the platinum catalyst is a platinum-styrene complex.

When employing exceptionally small quantities of the platinum catalyst, it is often desirable to dissolve the latter in a solvent which is inert to the reactants under the conditions of the reaction so as to facilitate uniform dispersion or solution of the platinum catalyst in the composition. Suitable solvents include, for example, hydrocarbon solvents such as benzene, toluene, xylene, mineral spirits, halogenated alkanes as well as oxygenated solvents such as dioxane, ethanol, butanol and the like. Where a diluent or solvent is employed, the amount of the latter is not critical. Satisfactory solutions of platinum catalysts can be prepared which contain from 0.0001 to 0.1 part of elemental platinum per part of solvent.

The proportions of the various ingredients employed in the practice of the present invention can vary within wide limits and the proportions of ingredients are not affected by the stoichiometry of the addition reactants involved, since many of the products prepared in accordance with this invention exhibit satisfactory properties even though the final product may contain unreacted alkenyl radicals or unreacted silicon-bonded hydrogen atoms. When the organosilicon compound contains alkenyl radicals such as vinyl or allyl radicals, the organosilicon compound and the organohydrogenpolysiloxane should be present in such proportions that the reaction mixture contains from 0.005 to 20 silicon-bonded hydrogen groups per alkenyl group. Moreover, it is preferred that an equal number of silicon-bonded hydrogen groups and alkenyl groups be present in the reaction mixture to form a composition which is free of silicon-bonded hydrogen groups and alkenyl groups.

Even though neither the hydroxyl-containing organopolysiloxane nor the organosilicon compound contains aliphatically unsaturated carbon-to-carbon bonds, the amount of organohydrogenpolysiloxane present in the composition should range from about 1 to 15 percent by weight and more preferably from 2 to 10 percent by weight based on the weight of the hydroxyl-containing organopolysiloxane.

Generally, the total amount of crosslinking agents present in the composition, i.e., the organosilicon compound and the organohydrogenpolysiloxane, will range from about 1.2 to 30 percent by weight and more preferably from about 5 to 20 percent by weight based on the weight of the hydroxyl-containing organopolysiloxane.

The platinum catalyst is generally added to the mixture containing the organopolysiloxane, the organosilicon compound and the organohydrogenpolysiloxane in an amount based on the amount of alkenyl radicals present in the composition. One advantage of the present invention is that the platinum can be added in a variety of concentrations and still act satisfactorily as the catalyst. Satisfactory results are obtained when the platinum catalyst is present in an amount sufficient to provide from 0.5 to 500 ppm by weight and more preferably from 2 to 300 ppm by weight calculated as platinum and based on the total weight of the composition.

In preparing the compositions of this invention, the components can be mixed in any sequence. Preferably, however, the organosilicon compound and condensation catalyst, if employed, are first mixed with the hydroxyl-containing organopolysiloxane at room temperature under anhydrous conditions. The organohydrogenpolysiloxane and platinum catalyst are then mixed with the resultant composition at room temperature and under anhydrous conditions. If desired, mixing of the components can be done at higher temperatures, for example, at a temperature of from 25° to 50° C.

The resultant compositions can be prepared just prior to use or they can be prepared and stored for later use. However, when these compositions are to be stored for later use, they are preferably stored as a two-package system under anhydrous conditions at room temperature. In certain cases, it has been observed that some gassing has occurred in a sealed container when a single package system has been stored for long periods of time.

When the compositions of this invention are stored as a two-package system, the organohydrogenpolysiloxane or the platinum catalyst must be kept separate from the other components of the composition. In such a system, it is preferred that the organohydrogenpolysiloxane be kept separate from the other components; otherwise some gas may be released. Generally, in the two-package system, one package will contain the hydroxyl-containing organopolysiloxane, the organosilicon compound, condensation catalyst, and if desired (d), the platinum catalyst and the second package will contain the organohydrogenpolysiloxane. When the two-package system is to be used, the components are mixed together, preferably at room temperature under anhydrous conditions.

Crosslinking of the compositions of this invention can be accomplished at elevated temperatures in the presence of atmospheric moisture. Generally, crosslinking will occur at temperatures of from about 80° to 220° C. and more preferably at temperatures of from about 100° to 180° C. The time required for crosslinking can also vary over a wide range, depending on the particular reactants involved, the proportions of reactants and the temperature employed. Thus, crosslinking can be affected in times which vary from a few minutes up to 24 hours or more. Generally, the rate of reaction increases as the temperature increases and as the concentration of the platinum catalyst in the reaction mixture increases.

In addition to the above components, other materials can be present in the compositions of this invention. Such materials are generally used in organopolysiloxane compositions and include reinforcing fillers, non-reinforcing fillers, pigments, soluble dyes, scents, organic polymers such as a copolymer of acrylonitrile, polyvinyl chloride powder, corrosion inhibitors, oxidation inhibitors, heat stabilizers, solvents, adhesion promoting agents such as gamma-glycidoxypropyltriethoxysilane, carbon blacks, graphite and plasticizers such as trimethylsiloxy terminated dimethylpolysiloxanes which are fluid at room temperature, or phosphoric acid esters, ultraviolet absorbers and cell-generating substances such as azodicarbonamide.

Examples of reinforcing fillers, i.e., fillers having a surface area of at least 50 $m^2/g$ are pyrogenically produced silicon dioxides, silicic acid hydrogels which have been dehydrated while maintaining their structure, and other types of precipitated silicon dioxide having a surface area of at least 50 $m^2/g$ and metal oxides, such as titanium dioxide, ferric oxide, aluminum oxide and zinc oxide, provided the metal oxides have a surface area of at least 50 $m^2/g$.

Examples of non-reinforcing fillers, i.e., fillers having a surface area of less than 50 $m^2/g$, are quartz meal, diatomaceous earth, Neuburg Chalk, calcium silicate, zirconium silicate, calcium carbonate, for example in the form of ground chalk, calcined aluminum silicate and powdered sodium aluminum silicate with molecular sieve properties.

Fibrous fillers such as asbestos and glass fibers, especially those having an average fiber length of no more than 0.5 mm and/or organic fibers may be used as well.

All the previously cited inorganic reinforcing and non-reinforcing fillers may be treated with a hydrophobic agent, for example, trimethylethoxysilane or stearic acid to impart hydrophobic properties thereto. If such a treatment is desired, it may be carried out, for example, in a ball mill.

Mixtures of various reinforcing and/or non-reinforcing fillers may also be employed in the compositions of this invention.

The organopolysiloxane compositions of the present invention can be used in various fields of application where silicone elastomers have been used heretofore. For example, these compositions can be molded to form articles of silicone elastomers, they may be used to form molds, as sealants, as insulation, as potting compounds and as coatings on various substrates. These organopolysiloxane compositions may also be used as casting or imbedding compositions for electronic components.

Preparation of Platinum-styrene Complex

The platinum-styrene complex used in the examples is prepared by adding about 6 parts of sodium bicarbonate to a mixture containing 3 parts of chloroplatinic acid ($H_2PtCl_6 \cdot 6H_2O$), 6 parts of styrene and 50 parts of ethanol. The mixture is heated to reflux temperature, (about 55° C.) and refluxed for about 35 minutes with agitation, and then cooled to room temperature. The resultant mixture which contains orange crystals is filtered and the crystals washed with about 30 parts of acetone. After adding about 30 parts of xylene to the filtrate, crystals are again formed. The crystalline mixture is filtered and the orange crystals are recovered and dried. These crystals are then dissolved in isopropanol.

In the following examples, all parts are by weight unless otherwise specified.

EXAMPLE 1

A composition is prepared by mixing the following components under anhydrous conditions:
(a) 100 parts of hydroxyl-terminated dimethylpolysiloxane having a viscosity of 450 mPa.s at 25° C.;
(b) 10 parts of an oximosilane of the formula $CH_2=CH\ Si[ON=C(CH_3)C_2H_5]_3$; and
(c) 5.2 parts of a siloxane copolymer containing methylvinylsiloxane units, dimethylsiloxane units and methylhydrogensiloxane units and having a silicon to hydrogen ratio of 4:3 and a vinyl content of 1 weight percent.

To the above mixture is added a sufficient amount of the platinum-styrene complex prepared above so that 7 ppm of elemental platinum are present in the mixture. The resultant composition is spread as a film, 2 mils in thickness, on Mylar (Trademark of E. I. duPont deNemours & Co.) and heated at 175° C. A complete cure is obtained in 3 minutes. When the composition is spread as a thin film on an asbestos-rubber substrate and heated at 175°, a complete cure is achieved in 15 minutes.

EXAMPLE 2

A composition is prepared by mixing the following components under anhydrous conditions:
(a) 100 parts of hydroxyl-terminated dimethylpolysiloxane having a viscosity of 4000 mPa.s at 25° C.;
(b) 10 parts of an oximosilane of the formula $CH_2=CH\ Si[ON=C(CH_3)C_2H_5]_3$;
(c) 5.2 parts of a siloxane copolymer containing dimethylsiloxane units and methylhydrogensiloxane units containing a silicon to hydrogen ratio of 3:2; and
(d) 50 parts of diatomaceous earth.

To the above mixture is added a sufficient amount of the platinum-styrene complex prepared above to provide 7 ppm of elemental platinum. The composition is spread as a film, 2 mils in thickness, on Mylar and heated at 175° C. A complete cure is achieved in 5 minutes.

EXAMPLE 3

A composition is prepared by mixing the following components under anhydrous conditions:
(a) 100 parts of hydroxyl-terminated siloxane copolymer containing methylvinylsiloxane units and dimethylsiloxane units having a viscosity of 4000 mPa.s at 25° C.
(b) 10 parts of an oximosilane of the formula $CH_3Si[ON=C(CH_3)C_2H_5]_3$; and
(c) 5.2 parts of a siloxane copolymer having dimethylsiloxane units and methylhydrogensiloxane units with a silicon to hydrogen ratio of 3:2.

To the above mixture is added a sufficient amount of the platinum-styrene complex prepared above so that 7 ppm of elemental platinum are present in the mixture. The composition is spread as a 2 mil film on a Mylar sheet and heated to 175° C. The composition cures in 2 minutes and exhibits excellent adhesion to the substrate.

EXAMPLE 4

The procedure of Example 3 is repeated except that 100 parts of hydroxyl-terminated dimethylpolysiloxane is substituted for the hydroxyl-terminated siloxane copolymer containing methylvinylsiloxane units and dimethylsiloxane units. The composition cures within 3 minutes when spread as a 2 mil film on a Mylar sheet and heated to 175° C.

EXAMPLE 5

A composition is prepared by mixing the following components under anhydrous conditions:
(a) 100 parts of hydroxyl-terminated dimethyl polysiloxane having a viscosity of 20,000 mPa.s at 25° C.;
(b) 0.6 parts of methylvinyl bis-(sec-butylamino) silane;
(c) 3.0 parts of a siloxane copolymer containing dimethylsiloxane units, and methylhydrogensiloxane units and having a silicon to hydrogen ratio of 3:2.

To the above mixture is added a sufficient amount of chloroplatinic acid dissolved in 2-ethylhexanol so that 7 ppm of elemental platinum are present in the mixture. The composition cures within five minutes when spread as a 2 mil film on a Mylar sheet and heated at 175° C.

EXAMPLE 6

A composition is prepared by mixing the following components under anhydrous conditions:
(a) 100 parts of hydroxyl-terminated dimethylpolysiloxane having a viscosity of 2000 mPa.s at 25° C.;
(b) 10 parts of an oximosilane of the formula $CH_2=CH\ Si[ON=C(CH_3)C_2H_5]_3$; and
(c) 5.2 parts of a siloxane copolymer containing methylvinylsiloxane units, dimethylsiloxane units and methylhydrogensiloxane units and having a silicon to hydrogen ratio of 4:3 and a vinyl content of 1 weight percent.

To the above mixture is added a sufficient amount of the platinum-styrene complex prepared above to provide 7 ppm of elemental platinum. When the composition is spread as a 2 mil film on a Mylar sheet and heated to 175° C., it cures in 2 minutes.

Another sample of the composition is stored at room temperature under anhydrous conditions. The composition is still fluid after 3 months. After storing for 3 months, a sample is then applied on a Mylar sheet, 2 mils in thickness, and heated to 175° C. The cure time is the same as above.

EXAMPLE 7

A composition is prepared by mixing the following components under anhydrous conditions:
(a) 100 parts of hydroxyl-terminated dimethylpolysiloxane having a viscosity of 4000 mPa.s at 25° C.;
(b) 10 parts of an oximosilane of the formula $CH_2=CH$ $Si[ON=C(CH_3)C_2H_5]_3$;
(c) 5.2 parts of a siloxane copolymer containing methylvinylsiloxane units, dimethylsiloxane units and methylhydrogensiloxane units having a silicon to hydrogen ratio of 4:3 and a vinyl content of 1 weight percent;
(d) 60 parts of silicon dioxide having an average particle size of 5 microns; and
(e) 4 parts of titanium dioxide.

To the above mixture is added a sufficient amount of the platinum-styrene complex prepared above to provide 7 ppm of elemental platinum. When the composition is spread as a 2 mil film on a Mylar sheet and heated at 175° C., it cures in 5 minutes.

EXAMPLE 8

A composition is prepared by mixing the following components under anhydrous conditions:
(a) 100 parts of hydroxyl-terminated dimethylpolysiloxane having a viscosity of 2000 mPa.s at 25° C.;
(b) 9.4 parts of vinyltriacetoxysilane; and
(c) 6.8 parts of a siloxane copolymer containing dimethylsiloxane units, and methylhydrogensiloxane units and having a silicon to hydrogen ratio of 3:2.

To the above mixture is added a sufficient amount of chloroplatinic acid dissolved in 2-ethylhexanol to provide 7 ppm of elemental platinum. When the composition is spread as a 2 mil thickness on a Mylar sheet and heated at 130° C., it cures in 3 minutes. The cured composition exhibits excellent adhesion to the substrate.

EXAMPLE 9

The following composition is prepared by mixing the following components under anhydrous conditions:
(a) 100 parts of hydroxyl-terminated dimethylpolysiloxane having a viscosity of 4000 mPa.s at 25° C.;
(b) 10 parts of an oximosilane having the formula $CH_2=CH$ $Si[ON=C(CH_3)C_2H_5]_3$;
(c) 5.2 parts of a siloxane copolymer containing dimethylsiloxane units and methylhydrogensiloxane units; and
(d) 30 parts of calcium carbonate.

The platinum-styrene complex prepared above is added to the mixture so that 7 ppm of elemental platinum are present in the mixture. When the composition is spread as a 2 mil film on a Mylar sheet and heated to 175° C., it cures in 8 minutes.

EXAMPLE 10

A composition is prepared by mixing the following components under anhydrous conditions:
(a) 100 parts of hydroxyl-terminated dimethylpolysiloxane having a viscosity of 4000 mPa.s at 25° C.;
(b) 10 parts of an oximosilane of the formula $CH_2=CH$ $Si[ON=C(CH_3)C_2H_5]_3$;
(c) 5.2 parts of a siloxane copolymer containing methylvinylsiloxane units, dimethylsiloxane units and methylhydrogensiloxane units and having a silicon to hydrogen ratio of 4:3 and a vinyl content of 1 weight percent;
(d) 30 parts of calcium carbonate;
(e) 5 parts of cobalt chromium oxide green pigment (a 50 percent by weight dispersion in dimethylpolysiloxane).

The platinum-styrene complex prepared above is added to the mixture so that 7 ppm of elemental platinum is present in the mixture. When the composition is spread as a 2 mil film on a Mylar sheet and heated to 175° C., it cures in 7 minutes.

EXAMPLE 11

A composition is prepared by dissolving 60 parts by weight of a methyl silicone resin having an average molecular weight of 3300 and containing 0.8 percent by weight of hydroxyl groups and 4.0 percent by weight of ethoxy groups (available from Wacker-Chemie as MK Resin) in 40 parts by weight of odorless mineral spirits. To this solution is added 11 parts by weight of an oximosilane of the formula $CH_2=CH$ $Si[ON=C(CH_3)C_2H_5]_3$, 3 parts by weight of a siloxane copolymer containing dimethylsiloxane units and methylhydrogensiloxane units, in which the silicon to hydrogen ratio is 3:2 and sufficient amount of the platinum-styrene complex prepared above to provide 5 parts per million by weight of elemental platinum.

When this composition is spread as a 2 mil film on a Mylar sheet and heated at 150° C., it cures to a tack-free condition in 2 minutes.

COMPARISON EXAMPLE V₁

The following composition is prepared by mixing the following components under anhydrous conditions:
(a) 100 parts of a siloxane copolymer containing methylvinylsiloxane units and dimethylsiloxane units having a viscosity of 11 mPa.s at 25° C.; and
(b) 5.2 parts of a siloxane copolymer containing dimethylsiloxane units and methylhydrogensiloxane units having a silicon to hydrogen ratio of 3:2.

The platinum-styrene complex prepared above is added to the mixture in a sufficient amount to provide 7 ppm of elemental platinum.

The resultant composition is applied as a 2 mil film on an aluminum substrate, a cured silicone rubber substrate and an asbestos impregnated organic rubber substrate and heated to about 175° C.

The cured silicone rubber substrate is prepared by mixing 50 parts of hydroxyl-terminated dimethylpolysiloxane having a viscosity of 3000 mPa.s at 25° C. with 37 parts of iron oxide, 2.5 parts of ethylsilicate "40" and dibutyltin butoxy chloride, in such an amount that 930 ppm of elemental tin are present in the composition. The resultant composition is formed into a ⅛ inch film and then exposed to atmospheric moisture for 24 hours.

The cure rate is illustrated in the following table:

TABLE

| Composition | Substrate | Time Elapsed In Minutes | Physical State |
|---|---|---|---|
| Example 3 | Asbestos-Rubber | 10 | Cured |
| Example 6 | Aluminum | 10 | Cured |
| Example 6 | Silicone Rubber | 10 | Cured |
| Example 8 | Asbestos-Rubber | 10 | Cured |
| Comparison Example | | | |
| V₁ | Aluminum | 10 | Cured |
| V₁ | Silicone Rubber | 60 | Uncured |
| V₁ | Asbestos-Rubber | 60 | Uncured |

What is claimed is:

1. An organopolysiloxane composition which forms an elastomer at an elevated temperature comprising:
   (a) An organopolysiloxane having an average of at least two hydroxyl groups per molecule;
   (b) an organosilicon compound containing aliphatic unsaturation and having an average of at least two hydrolyzable groups per molecule, said hydrolyzable groups are linked to a silicon atom of the organosilicon compound and are selected from the group consisting of acyloxy groups, aminoxy groups, amine groups, acylamine groups, oxime groups, mixtures and partial hydrolyzates thereof having 2 to 10 silicon atoms per molecule;
   (c) an organohydrogenpolysiloxane having an average of at least one silicon-bonded hydrogen atom per molecule;
   (d) a platinum catalyst; and
   (e) from 0 to 8 percent by weight based on the weight of the organopolysiloxane of a condensation catalyst 2. The composition of claim 1, wherein the condensation catalyst is present in the composition in an amount of at least 1 percent by weight based on the weight of the organopolysiloxane.

3. The composition of claim 1, wherein the composition contains a filler.

4. The composition of claim 1, wherein the organosilicon compound is selected from the group consisting of a silane of the formula $$R'_a SiZ_{4-a}$$

where R' is a monovalent hydrocarbon radical having aliphatic unsaturation, Z is a hydrolyzable group selected from the group consisting of acyloxy groups, aminoxy groups, amine groups, acylamine groups, oxime groups, mixtures and partial hydrolyzates thereof having from 2 to 10 silicon atoms per molecule and a is 1 or 2.

5. The composition of claim 4, wherein Z is a mixture of hydrolyzable groups.

6. The composition of claim 4, wherein a is 2.

7. The composition of claim 4, wherein Z is an acyloxy group.

8. The composition of claim 4, wherein Z is an aminoxy group.

9. The composition of claim 4, wherein Z is an amine group.

10. The composition of claim 4, wherein Z is an acylamine group.

11. The composition of claim 4, wherein Z is an oxime group.

12. The composition of claim 1, wherein the organopolysiloxane is a hydroxyl-terminated organopolysiloxane.

13. The composition of claim 12, wherein the hydroxyl-terminated organopolysiloxane is represented by the formula $$HO-SiR_2(OSiR_2)_m OSiR_2 OH$$

where R is selected from the group consisting of monovalent hydrocarbon radicals and substituted monovalent hydrocarbon radicals having from 1 to 18 carbon atoms and m is a number such that the viscosity is from 50 to 500,000 mPa.s at 25° C.

14. The composition of claim 1, wherein the organohydrogenpolysiloxane is represented by the formula $$R_b H_c SiO_{\frac{4-b-c}{2}}$$

where R is selected from the group consisting of a monovalent hydrocarbon radical and a substituted monovalent hydrocarbon radical, b has a value of from 0 to 2.5; c has a value of from 0.0005 to 2.0 and the sum of b+c is equal to from 1.0 to 3.

15. The composition of claim 1, wherein the organohydrogenpolysiloxane is a copolymer having at least one siloxane unit of the formula $$R_d H_e SiO_{\frac{4-d-e}{2}}$$

where R is selected from the group consisting of a monovalent hydrocarbon radical and a substituted monovalent hydrocarbon radical, d has a value of 0, 1 or 2, e has a value of 1 or 2 and the sum of d+e is 1, 2 or 3 and the remaining siloxane units are represented by the formula $$R_f SiO_{\frac{4-f}{2}}$$

where R is selected from the group consisting of a monovalent hydrocarbon radical and a substituted monovalent hydrocarbon radical and f has a value of 0, 1, 2 or 3.

16. The composition of claim 1, wherein the organohydrogenpolysiloxane has a viscosity of from 10 to 500,000 mPa.s at 25° C.

17. The composition of claim 1, wherein the organosilicon compound contains at least one vinyl group.

18. The composition of claim 1, wherein the organohydrogenpolysiloxane is present in an amount of from 1 to 15 percent by weight based on the weight of the hydroxyl-containing organopolysiloxane.

19. The composition of claim 1, wherein the hydroxyl-containing organopolysiloxane contains at least one alkenyl group per molecule and the organohydrogenpolysiloxane is present in an amount such that from 0.005 to 20 silicon-bonded hydrogen groups are present per alkenyl group.

20. The composition of claim 3, wherein the filler is a reinforcing filler.

21. The composition of claim 1, wherein the platinum catalyst is present in an amount of from one platinum atom per 1000 to one platinum atom per 100,000 parts of hydroxyl-containing organopolysiloxane.

22. An organopolysiloxane elastomer which is obtained by heating the composition of claim 1 to an elevated temperature.

23. The cured composition of claim 1.
24. The cured composition of claim 2.
25. The cured composition of claim 3.
26. A process for preparing the composition of claim 1, which comprises (1) mixing under anhydrous conditions, a hydroxyl-containing organopolysiloxane having an average of at least two hydroxyl groups per molecule with an organosilicon compound containing aliphatic unsaturation and having at least two hydrolyzable groups per molecule, in which the hydrolyzable groups are linked to the silicon atom of the organosilicon compound and are selected from the group consisting of acyloxy groups, aminoxy groups, amine groups, acylamine groups, oxime groups, mixtures and partial hydrolyzates thereof having from 2 to 10 silicon atoms per molecule, (2) adding an organohydrogenpolysiloxane, a platinum catalyst and from 0 to 8 percent by weight based on the weight of the organopolysiloxane of a condensation catalyst to the resultant mixture and then (3) heating the composition to an elevated temperature.

27. The process of claim 26, wherein the composition contains at least 1 percent by weight based on the weight of the organopolysiloxane of a condensation catalyst.

28. A two-package system which comprises one-package containing:

(a) an organopolysiloxane having an average of at least two hydroxyl groups per molecule;
(b) an organosilicon compound having an average of at least one alkenyl group per molecule and at least two hydrolyzable groups per molecule, said hydrolyzable groups are selected from the group consisting of aclyoxy groups, aminoxy groups, amine groups, acylamine gropps, oxime groups, mixtures and partial hydrolyzates thereof having from 2 to 10 silicon atoms per molecule;
(c) a platinum catalyst; and a second package containing
(d) an organohydrogenpolysiloxane having an average of at least one silicon-bonded hydrogen atom per molecule. I

* * * * *